United States Patent [19]

Miller

[11] Patent Number: 5,939,798
[45] Date of Patent: Aug. 17, 1999

[54] HYBRID ENERGY STORAGE SYSTEM

[75] Inventor: Nicholas Wright Miller, Delmar, N.Y.

[73] Assignee: General Electric Company, Schenetady, N.Y.

[21] Appl. No.: 08/877,224

[22] Filed: Jun. 17, 1997

[51] Int. Cl.[6] .................................... H02J 7/00
[52] U.S. Cl. ........................ 307/64; 307/43; 307/82
[58] Field of Search ...................... 307/43, 44, 64, 307/65, 66, 80, 82

[56] References Cited

U.S. PATENT DOCUMENTS

| | | | |
|---|---|---|---|
| 4,719,550 | 1/1988 | Powell et al. | 363/37 |
| 5,442,512 | 8/1995 | Bradbury | 361/683 |
| 5,458,991 | 10/1995 | Severinsky | 429/61 |
| 5,477,091 | 12/1995 | Fiorina et al. | 307/66 |
| 5,747,887 | 5/1998 | Takanaga et al. | 307/64 |
| 5,786,642 | 7/1998 | Wilhelm | 307/72 |

*Primary Examiner*—Jeffrey Gaffin
*Assistant Examiner*—Jonathan S Kaplan
*Attorney, Agent, or Firm*—Cantor Colburn LLP; Carl B. Horton

[57] ABSTRACT

An energy storage system including a first power conversion device and a second power conversion device for providing energy to loads upon interruption of a main power source. A first power conversion device is connected in parallel to a first load, receives energy from an energy storage device and provides power to the first load. A second power conversion device is connected in series with a second load, receives energy from the energy storage device and provides power to the second load. The first and second power conversion devices are rated so that power consumption by the power conversion devices is reduced.

6 Claims, 3 Drawing Sheets

HYBRID ENERGY STORAGE SYSTEM

BACKGROUND OF THE INVENTION

1. Field of the Invention

The invention relates in general to energy storage systems for use in AC distribution networks and in particular to a hybrid energy storage system including different types of power conversion devices to reduce power consumption.

2. Prior Art

Energy storage systems are used in power distribution systems to provide power to loads when the loads are disconnected from the host power grid. A conventional energy storage system is a battery energy storage system (BESS). FIG. 1 is a schematic diagram of a portion of an AC power distribution system including a BESS shown generally at 10. The power distribution system includes a utility bus 12 for providing electricity to a load 14 through a switch 16 (e.g. circuit breaker). If disturbances occur on the host utility bus 12, the switch 16 is opened and the load 14 is disconnected from the utility bus 12.

The BESS 10 includes a transformer 18 for coupling the AC power from utility bus 12 to a power converter 20. Power converter 20 converts bi-directionally from AC to DC and DC to AC. Battery 22 stores the energy imported from utility bus 12 and converted from AC to DC by the power converter 20. If switch 16 is opened due to a disturbance on the utility bus 12, DC power from the battery 22 is converted to AC through power converter 20 and supplied to load 14 through transformer 18. Inductor 24 and capacitor 26 filter unwanted components (e.g. harmonic currents).

When connected to the utility bus 12, the BESS 10 supplies reactive power which maintains the terminal voltage. In addition, the frequency and phase of BESS voltage is adjusted to supply the required active power. When switch 16 is opened, isolating the BESS 10 from the utility bus 12, the power converter 20 establishes the required frequency and voltage. A disadvantage of the conventional BESS is that the load 14 is subject to the disturbances on the utility bus 12 for a short period time until the disturbance is removed, or the switch 16 is opened to isolate the load 14 and the BESS 10 from the disturbance. In some applications, a portion of the load 14 is very sensitive and is unacceptably affected during the period of time until the disturbance is removed or isolated.

FIG. 2 is a schematic diagram of a BESS 10 coupled to a critical portion of a load. Switches 32 and 34 connect the critical load 38 and the balance of the load 40 to the AC system 30. The power consumption and quality is monitored at metering point 36. When the BESS 10 is connected to the AC system 30, it provides various power control functions. As described above, the BESS 10 regulates voltage to the critical load 38. The BESS 10 also moderates the effects of load swings and impact loads, improves power system stability for remote or weak utility connections, combines active and reactive power to provide voltage support and provides energy management and standby power benefits.

FIG. 3 is a schematic diagram of the system in FIG. 2 after a disturbance has occurred in the AC system 30 and switches 32 and 34 are opened. In this mode of operation, the BESS 10 provides power to the critical load 38. In order to reach the condition shown in FIG. 3, the switch 34 must quickly isolate the BESS 10 and the critical load 38 from the AC system 30 during the disturbance (particularly voltage depression or momentary outage). During isolated operation, the BESS 10 must regulate frequency through active power control (a governor function) and regulate voltage through continuous control of reactive power (a voltage regulator function). When isolated, the BESS 10 provides necessary active and reactive power and energy for these regulation functions.

FIG. 4 is a schematic diagram of another conventional system for providing power to a critical or protected load. As shown in FIG. 4, the AC system 30 is connected to a protected load 54 through a switch 52 and an uninteruptable power supply (UPS) 50. The UPS 50 includes two power convertors 56 and 58 and battery 60. Power converter 56 converts the AC power from the AC system 30 to DC power and charges battery 60. Power converter 58 converts DC power, from either power converter 56 or battery 60, into AC power and provides the AC power to protected load 54.

Unlike BESS 10, UPS 50 is positioned between the protected load 54 and the AC system 30. Consequently, when there is a disturbance on the host grid, the protected load 54 is effectively instantaneously isolated, and therefore protected, from the upset. The disadvantage of this approach is that all of the power provided to the protected load 54 must pass through the UPS 50 on a continuous basis. The converters 56 and 58 each must have a power rating at least equal to that of the protected load 54. There are significant electric losses incurred in the two converters 56 and 58. The losses and equipment ratings tend to limit the practical application of the UPS 50 to relatively small loads, or to large sensitive homogeneous loads for which substantial penalties result from disturbances.

A summary of the BESS and UPS is provided in Table I below.

TABLE I

| FEATURE | BESS | UPS |
| --- | --- | --- |
| connection | parallel connected | series connected |
| isolation | requires switching to isolate bus (speed dictated by application) | dc bus buffers disturbances |
| losses | negligible when not charging or discharging | losses due to load current passing through converters (if no bypass switch) |
| power converters | one: ac↔dc | two: ac→dc and dc→ac |
| voltage regulation | continuous | not normally possible |
| power flow | bi-directional flow possible for both real and reactive power | unidirectional |

In practice, many loads (e.g., a factory, an office building, a mine, etc.) are composed of a heterogeneous aggregation of smaller loads which exhibit varying degrees of sensitivity to disruptions. In such a heterogeneous load, there are likely to be components which are very sensitive and other components which can tolerate the effects of a disturbance until it is removed or isolated. The use of a UPS to protect the entire load maybe uneconomic, and the use of a BESS will not meet the functional requirements of the very sensitive portion of the load. Therefore, there are limits to the use of BESS and UPS alone.

SUMMARY OF THE INVENTION

The above-discussed and other drawbacks and deficiencies of the prior art are overcome or alleviated by the hybrid energy storage system of the present invention. The energy storage system of the present invention includes a first power conversion device and a second power conversion device for providing power to loads upon interruption of a main power source. A first power conversion device is connected in parallel to a first load, receives energy from an energy storage device and provides power to the first load. A second power conversion device is connected in series with a second load, receives energy from the energy storage device and provides power to the second load. The first and second power conversion devices are selected so that the total power rating of the power conversion devices is reduced from that of a conventional UPS. Power consumption (losses) is similarly reduced.

By using a second power conversion device connected to a DC bus of a conventional BESS, a hybrid BESS and UPS is created, in which each of the components of the heterogeneous load described above can have their specific protection requirements met.

The above-discussed and other features and advantages of the present invention will be appreciated and understood by those skilled in the art from the following detailed description and drawings.

BRIEF DESCRIPTION OF THE DRAWINGS

Referring now to the drawings wherein like elements are numbered alike in the several FIGURES.

DETAILED DESCRIPTION OF THE INVENTION

Figure 5:
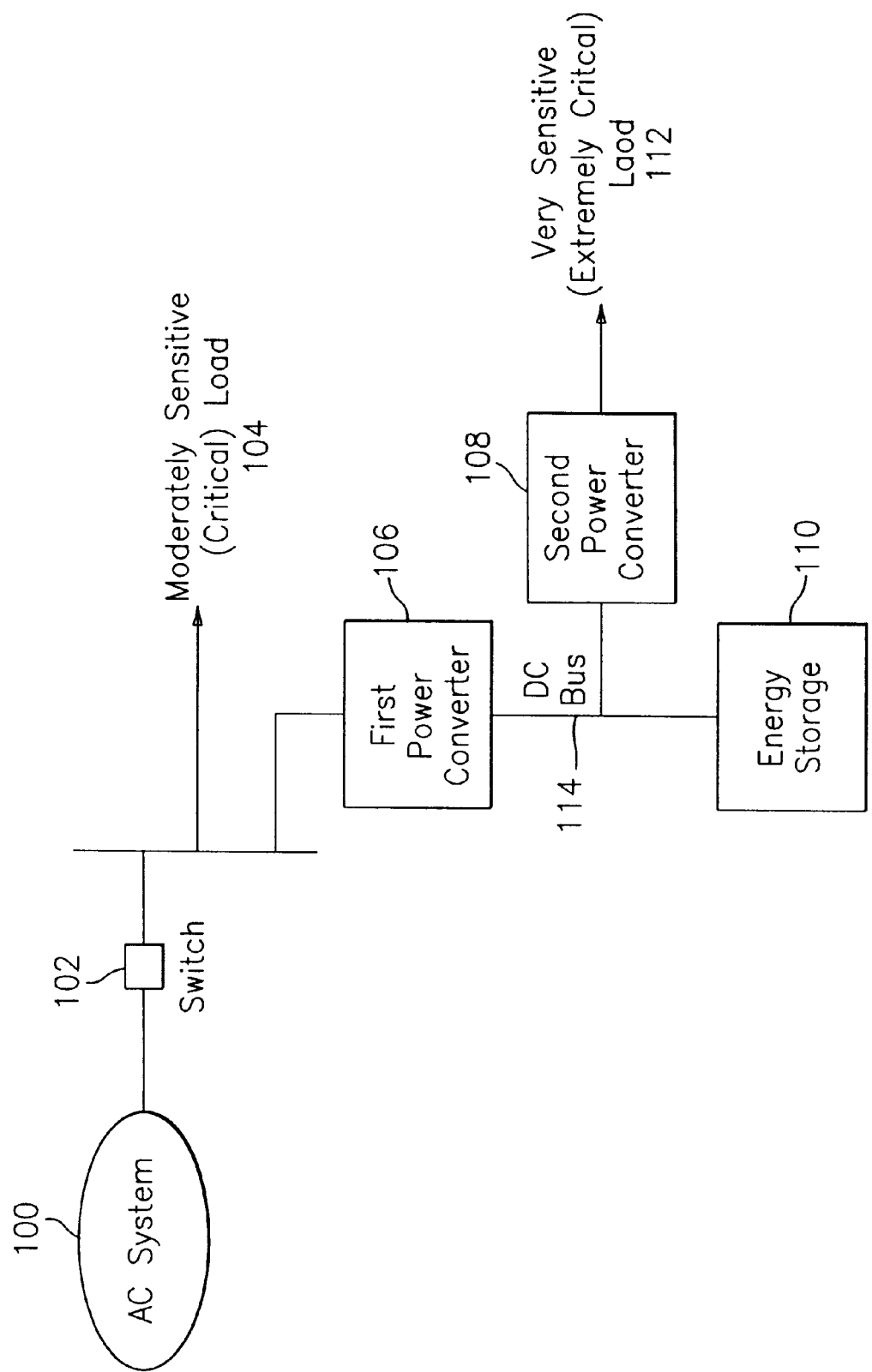
FIG. 5 is a schematic diagram of the hybrid energy storage system of the present invention.

FIG. 5 is a schematic diagram of the hybrid energy storage system of the present invention. The system includes an AC system (main power source) 100 coupled to a moderately sensitive first load 104 and very sensitive second load 112 through switch 102. A first power conversion device 106, based on a BESS configuration, is shunt connected (connected in parallel) to the first load 104. The first power conversion device 106 sends and retrieves power to and from an energy storage device 110. The energy storage device 110 may be electrochemical batteries or other storage devices, including but not limited to superconducting magnetic energy storage (SMES), flywheel energy storage, electric field or capacitive energy storage and fuel cells.

Figure 1:
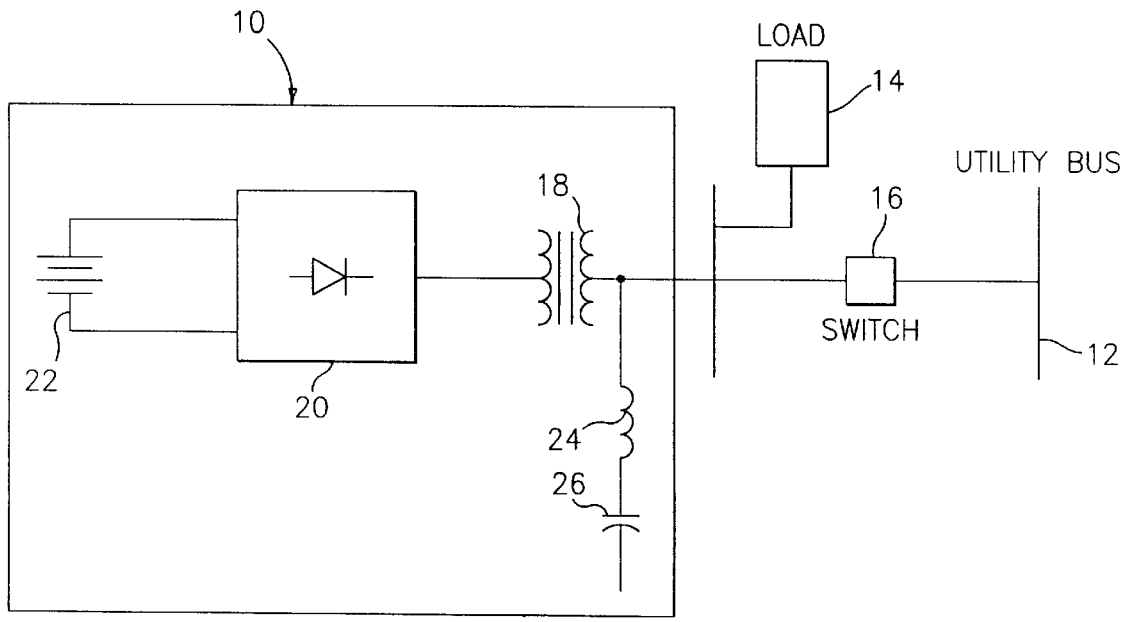
FIG. 1 is a schematic diagram of a conventional BESS in a power system.
Figure 2:
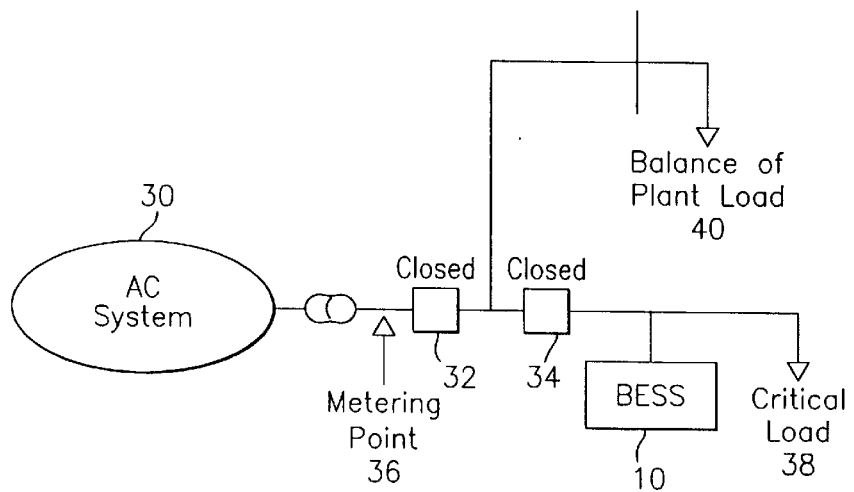
FIG. 2 is a schematic diagram of a conventional BESS in a power system.
Figure 3:
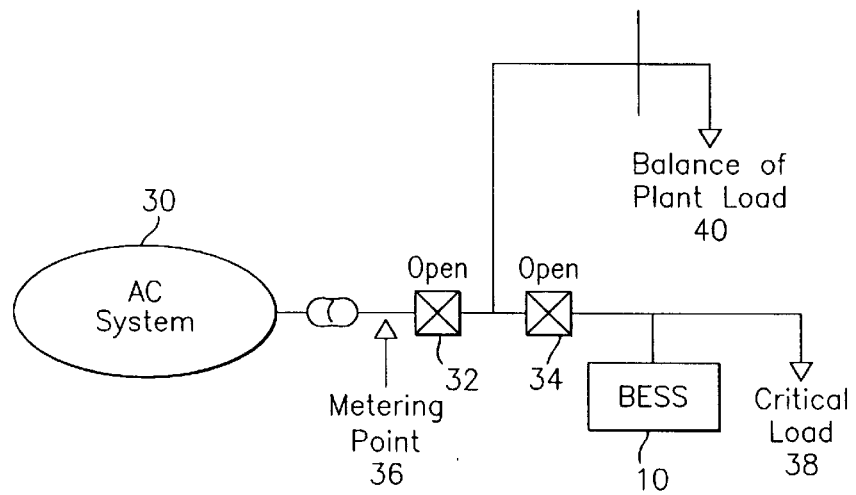
FIG. 3 is a schematic diagram of the system of FIG. 2 in an isolated state.

The first power conversion device 106 is similar to the BESS 10 shown in FIG. 1. The battery 22 in FIG. 1 is representative of the energy storage device 110. The first power conversion device 106 is connected to the energy storage device 110 at DC bus 114. During normal operating conditions, the first load 104 receives energy from both the AC system 100 and the energy storage device 110. In the event that a disturbance occurs on the AC system 100 and switch 102 is opened, the first load 104 (moderately sensitive) is supplied power from the energy storage device 110 via the first power conversion device 106. The first load 104 is moderately sensitive and can withstand the disturbances on the AC system 100 until the switch 102 is opened.

Figure 4:
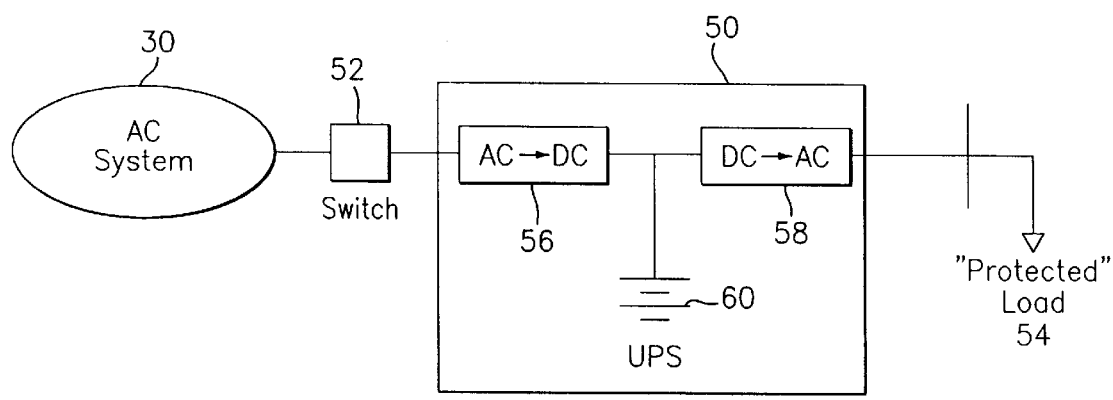
FIG. 4 is a schematic diagram of a conventional UPS.

A second power conversion device 108, based on UPS configuration, is connected in series to the second load 112. During normal operation, the second load 112 receives energy, through the second power conversion device 108, from the AC system 100 and the energy storage device 110. In the event that a disturbance occurs on the AC system 100 and switch 102 is opened, the second load 112 is supplied power from the energy storage device 110 via the second power conversion device 108. The second power conversion device 108 includes a DC to AC converter. The function of the AC to DC converter 56 in FIG. 4 is provided by the first power conversion device 106. The function of the battery 60 in FIG. 4 is provided by energy storage device 110. The second power conversion device 108 is connected to the first power conversion device 106 and the energy storage device 110 at DC bus 114.

The second power conversion device 108 supplies power to the second load 112 (very sensitive). The power requirement of second load 112 is generally less than the first load 104 and the second power conversion device 108 has a power rating less than the first power conversion device 106. As the rating of the second power conversion device 108 approaches that of the first power conversion device 106, the system has power ratings similar to conventional UPS. Conversely, as the rating of the second power conversion device 108 becomes arbitrarily small, the system becomes similar to a conventional BESS. The ratio of the rating of the second power conversion device 108 to the rating of the first power conversion device 106 is approximately the ratio of the second load 112 power to the sum of the first load 104 power and the second load 112 power.

The present invention utilizes the BESS and the UPS so as to minimize the disadvantages associated with these systems. The second power conversion device 108, based on a UPS design, provides power to a limited, very sensitive load 112. Accordingly, the losses associated with UPS's are minimized. The remaining first load 104, that can withstand slight disturbances, is supplied power from the first power conversion device 106, based on a BESS design, which does not consume as much power under normal conditions as a similarly rated UPS. Accordingly, the power consumption is reduced while still meeting the power needs of the various loads under emergency (post-disturbance) conditions.

While preferred embodiments have been shown and described, various modifications and substitutions may be made thereto without departing from the spirit and scope of the invention. Accordingly, it is to be understood that the present invention has been described by way of illustration and not limitation.

What is claimed is:

1. An energy storage system for supplying power to a first load and a second load in the event that a connection to a main power source is interrupted, the system comprising:
    an energy storage device for storing energy;
    a first power conversion device connected in series to said energy storage device, wherein the first power conversion device and the energy storage device are connected in parallel to the first load; and
    a second power conversion device, wherein said first power conversion device said second power conversion device and the second load are connected in series.

2. The energy storage system of claim 1 wherein said first power conversion device includes:
    a bidirectional AC-DC power converter connected to said energy storage device.

3. The energy storage system of claim 1 wherein said second power conversion device includes:
    a DC to AC power converter having an input connected to the first power conversion device and said energy storage device and an output connected to the second load.

4. The energy storage device of claim 1 wherein said energy storage device is connected to said first power conversion device and said second power conversion device at a junction disposed therebetween.

5. An energy storage system for supplying power to a first load and a second load in the event that a connection to a main power source is interrupted, the system comprising:

an energy storage device for storing energy;

a first power conversion device connected in series to said energy storage device, wherein the first power conversion device and the energy storage device are connected in parallel to the first load, the first power conversion device including:

a bi-directional AC-DC power converter connected to said energy storage device;

a second power conversion device, wherein said first power conversion device, said second power conversion device and the second load are connected in series, said second power conversion device including:

a DC to AC power converter having an input connected to said bi-directional AC-DC power converter and said energy storage device and an output connected to the second load.

6. The energy storage device of claim 5 wherein said energy storage device is connected to said first power conversion device and said second power conversion device at a junction disposed therebetween.

* * * * *